April 21, 1931. F. G. SALERNO 1,801,573
DEPOSITING MACHINE
Filed Sept. 23, 1929 3 Sheets-Sheet 1

Inventor
Ferdinando G. Salerno
By Rector, Hibben, Davis & Macauley
His Attys.

April 21, 1931.    F. G. SALERNO    1,801,573
DEPOSITING MACHINE
Filed Sept. 23, 1929    3 Sheets-Sheet 2

Inventor:
Ferdinando G. Salerno.
By Rector, Hibben, Davis, *illegible*
Attys.

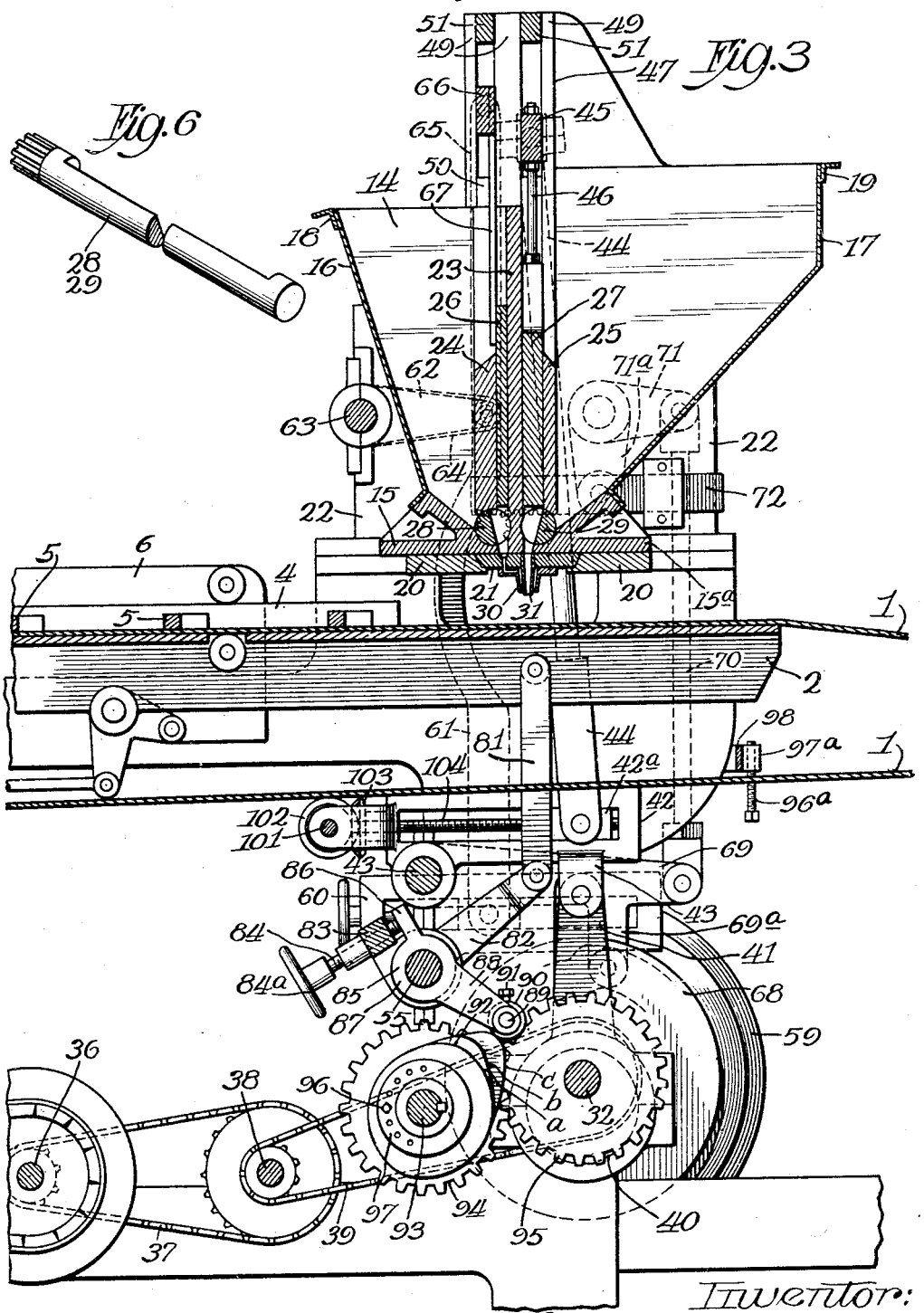

Patented Apr. 21, 1931

1,801,573

UNITED STATES PATENT OFFICE

FERDINANDO G. SALERNO, OF CHICAGO, ILLINOIS

DEPOSITING MACHINE

Application filed September 23, 1929. Serial No. 394,606.

My invention relates to machines for depositing coatings of various kinds of soft plastic confections, such as white or colored icings, chocolate or caramel coatings, jellies, jams and the like upon small cakes or wafers to produce what are known in the bakery trade as deposit goods. In my Patent No. 1,303,599, granted to me on May 13th, 1919, I have described a machine suitable for the commercial production of such goods rapidly and on a large scale, and my present invention relates to changes and modifications in the construction of parts and portions of such a depositing machine as that described in my said patent, for the purpose of better accomplishing the work to be performed, more particularly the construction and arrangement of the parts of the forcing mechanism for ejecting the coating materials from the hoppers for containing them, and means for timing the action of the forcing mechanism and varying the amount and contour of the coating applied through the depositing nozzles. In the following specification I have described my present invention and improvements, together with such other portions of a complete depositing machine as will be necessary for an understanding of the same, and in the appended claims have set forth the essential elements of my invention, it being understood, however, that I intend my claims to embrace all equivalents of the recited elements and such modifications and variations of construction as fall within the true scope of my invention, as determined by the improvements I have made upon machines heretofore known in the art.

In the accompanying drawings, Figure 1 is a side elevation of what I will term the right side of the machine;

Fig. 3 is a broken section in vertical planes extending longitudinally of the machine, as indicated by the dotted line 3—3 of Fig. 2, and looking in the direction of the arrow, parts beyond the plane of this section being shown in elevation;

Fig. 6 is a perspective of one of the valves of the depositing mechanism, detached; and Figs. 7, 8 and 9 are side views of cookies with differently shaped deposits of confection thereon, illustrating the effect of employing one or the other of the faces of a multiple-faced cam used to control the action of a rocking table forming a part of my improved depositing machine.

Like reference characters indicate like parts in all the figures of the drawings.

Figure 1:
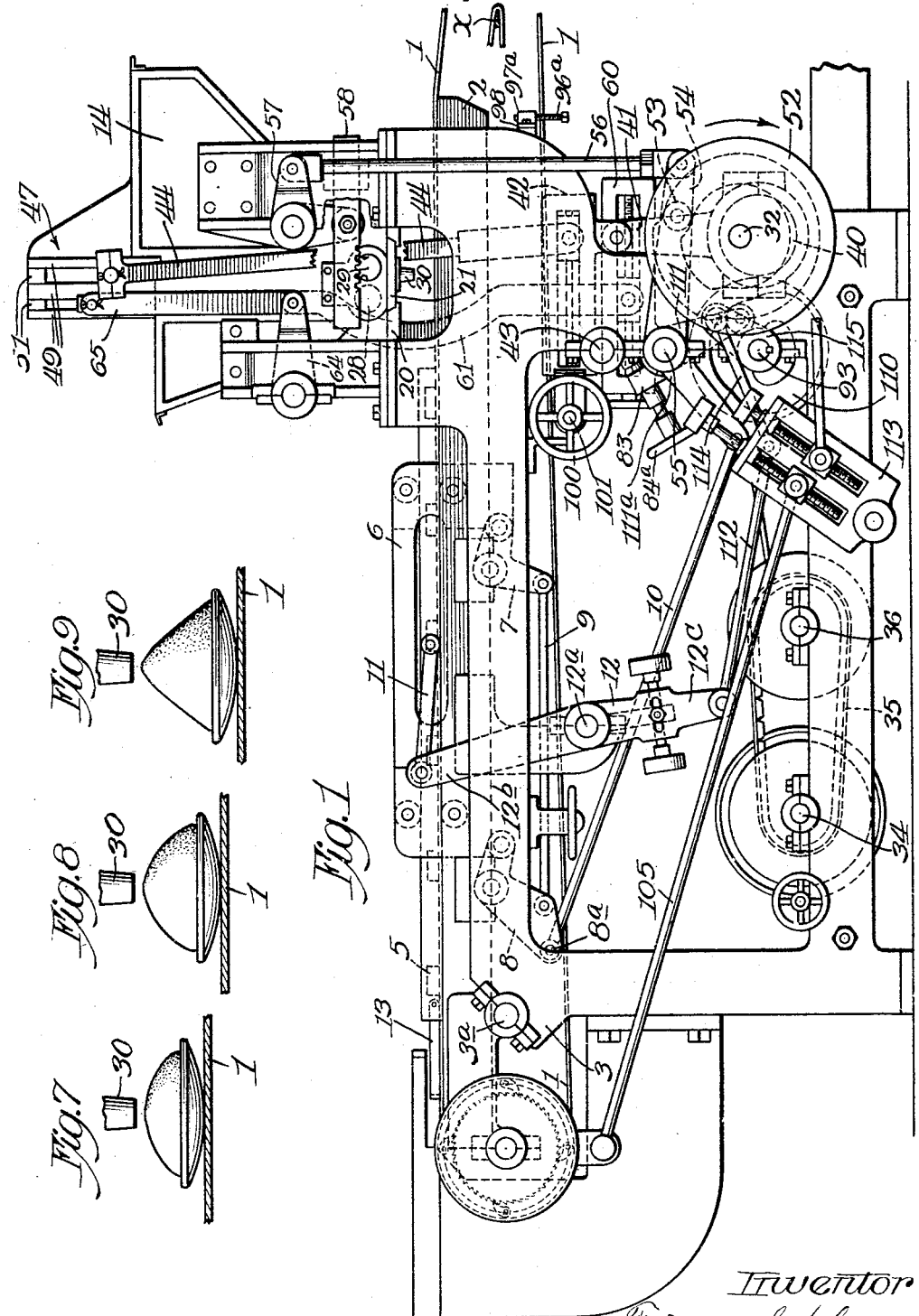

Preliminary to a description of the parts to which my invention particularly relates, a brief explanation of the general construction of the machine, and more particularly of the construction and arrangement of those portions of it with which the parts relating to my present invention are associated may first be given.

At what will be termed the rear end of the machine the previously formed cakes or wafers to be coated are fed in any suitable manner, a cross-row at a time upon the top of an endless feed belt 1, the top reach of which has an intermittent forward movement over the top of a rocking table 2 pivoted upon a cross-shaft 3ª in the machine frame 3 near its rear end. The belt is intermittently moved by a drum secured to a shaft pivoted in the rear end of the rocking table and its front end passes around a rounded cross bar x (see Fig. 1) stationarily supported in fixed position at the forward portion of the machine, which is broken away and not completely shown in the drawings. In the operation of the machine the front end of the table is given a slight rocking movement upwardly toward a row of confection feeding nozzles, and one feature of my present invention relates to the provision of means for varying the extent of this rocking movement.

The means for imparting intermittent movement to the drum and belt form no part of my present invention, but here it may be briefly explained that in this machine illustrated in the drawings it is effected through an oscillating pawl and ratchet mechanism, (see Fig. 1 arranged to be actuated by a connecting rod 105 pivotally connected to a short arm secured to a pawl-carrying casing 106 loosely mounted in the drum shaft and also pivoted to a pivot block adjustably mounted in a rocking frame 113 which is oscillated by means later to be described.

Adjacent the upper face of the feed belt and between the loop at the rear end thereof and the feeding nozzles of the depositing mechanism is arranged an aligning or rectifying frame consisting of side bars 4 and cross bars 5 formed with V-shaped notches on their forward sides. These side bars are mounted for longitudinal reciprocating movement in the side members 6 of a lifting frame, which itself is mounted in the rocking table to have a rising and falling movement therein. To this end the lifting frame is pivotally supported by the horizontal members of front bell crank levers 7 and rear bell crank levers 8 at each side of the machine, which levers are fixed to rock shafts journaled in the table frame and have vertical portions connected by connecting rods 9, whereby they may be rocked in unison through a connecting rod 10 which is pivoted to a cross-bar 8ª connecting the vertical portions of the two bell-crank levers 8, and suitable operating connections. As shown in the drawings,—see Figs. 1 and 2,—these connections may consist of a cam plate 110 fixed to a positively driven shaft 93, which will be mentioned again later, such plate being formed with a lateral cam groove arranged to cooperate with a roller mounted on one arm of a bell crank lever 111 loosely pivoted on a rock shaft 55, which will be referred to again. The other arm 111ª of this bell crank lever is pivoted to the connecting rod or link 10, (which need not here be described).

The rectifying frame is reciprocated in the lifting frame by means of a pair of opposite links 11 and a rocking frame 12 pivotally supported in the rocking table 2 and actuated by suitable operating connections.

In the present instance the frame 12, which consists of a rock shaft 12ª journaled in the machine frame and opposite arms 12ᵇ fixed to said shaft, is rocked by means of an arm 12ᶜ angularly adjustable on the rock shaft 12ª and adjustably secured to a depending extension of the adjacent arm 12ᵇ; a connecting rod 112, a rocking frame 113, a pitman 114, and a crank arm 115 secured to the positively driven shaft 93 above referred to.

Through the various operating connections, suitably timed for the purpose, the lifting frame together with the feeding frame is quickly elevated from a position adjacent the belt, then the feeding frame is moved rearwardly in the lifting frame while the lifting frame stands in elevated position, then the two frames are quickly lowered to a position adjacent the belt, and the feeding frame is then shifted forwardly in the lifting frame to move the rows of wafers forwardly on the belt towards the line of depositing nozzles. The forward movement of the feeding frame begins before the belt begins to move forward, and is not finished until after the belt has stopped, and as the frame moves the faster the wafers are moved forward on the belt while it travels. As the wafers are moved forward by the feeding frame, the pivoted table is rocked and the belt and wafers are moved upwardly so that the wafers momentarily come to rest in alignment with the nozzles and in close proximity to them, and at this period the portions of confectionery are deposited. In the rearward position of the feeding frame a bail 13 pivoted to the rear end of the feeding frame and which slides at all times over the surface of the feed belt lies to the rear of the position of a row of wafers fed onto the belt before its forward movement begins, and through the action of the bars of the feeding above described the rows of cakes are successively brought into accurate alignment with the depositing nozzles. The charges of confection are made on the wafers during their intervals of rest under the nozzles, after which the coated wafers are carried forward by the intermittent movement of the belt, and removed therefrom through means to which the present invention does not relate.

Proceeding now to a description of the depositing mechanism to which the present invention more particularly relates, the frame of the double compartment hopper includes end plates 14—14, connected at the bottom by rear and forward cross-plates 15—15ª having horizontal bottom portions and outwardly inclined upper portions, and rear and front sheet metal walls 16 and 17 riveted to the end plates and cross-plates and reinforced by light angle iron cross-strips, one marked 18, at the upper rear edge of the smaller hopper, which may be termed the chocolate hopper, and the other, marked 19, at the front edge of the larger or icing hopper. The end plates and cross-plates mentioned rest upon and are secured to two base plates 20—20, which will be termed die-holder plates, these plates being formed with underhanging beveled faces on their inner edges to engage the correspondingly beveled opposite edges of a die-plate or nozzle bar 21 interposed between them. The ends of the two die-holder plates, which together support the hopper frame rest in seats formed to receive them in the base portions of bracket blocks 22—22 secured to opposite sides of the frame of the machine.

The space between the end plates and cross-plates and the front and rear walls of the hopper structure is divided into two compartments by an approximately central partition wall 23 seated in vertical grooves in the two end plates, and also by a rear forcing chamber wall 24 and a front forcing chamber wall 25, both parallel with the wall 23 and likewise seated in opposite grooves in the end plates of the hopper frame. In the space between the walls 23 and 24 is arranged to work a flat plunger or piston 26, and between the walls 23 and 25 a similar plunger 27 each actuated through connections later to be described.

At the bottom of the chocolate hopper, a rotary valve 28 is seated in a circular seat formed in the rear cross-plate 15, partition wall 23, rear forcing chamber wall 24, and the side plates of the hopper frame,—see Fig. 3,—and at the bottom of the icing chamber, rotatably mounted in a similar manner, is arranged a similar valve 29. Between the inside faces of the side walls the valves are cut away as shown to severally govern communication between the hoppers and adjacent forcing chambers, and such chambers, respectively, and two series of ports formed in the plates 15 and 15ª which communicate respectively with outer nozzles 30 and concentric inner nozzles 31 through passages formed in the nozzle bar 21, to which the nozzles are secured. The arrangement is such that in one extreme position of the particular valve communication will be established between the adjacent hopper and adjacent forcing chamber, while communication through the nozzles associated with such chamber will be closed, and in the other extreme position communication between the hopper and forcing chamber will be closed and communication between the forcing chamber and associated nozzle established. The timing of movements of the associated plunger and valve is preferably such that the plunger will begin to rise an instant before the valve closes communication through the nozzles, with the result that a momentary slight suction at that time (and just before the feed table and belt reach lowermost position, as hereinafter explained), quickly breaks the stream of connection from the nozzles and prevents the formation of a nipple of confection at the center of the deposit.

To provide for the commercial production of a variety of goods by my novel depositing machine it is important to provide means whereby the two depositing machines may be adjusted relatively to each other so as to operate simultaneously or successively in any desired time relation, and also may be adjusted so as to deposit any desired quantity of confection at each depisiting operation. Thus by a relatively large deposit of icing and a subsequent deposit of a small amount of jelly, a wafer may be given a white coating with a superposed central drop of jelly; by a deposit of a limited amount of jelly followed by a large amount of icing, the wafer may be given a white coating covering a lower coating of jelly; or by a simultaneous deposit of jelly and icing the cake may be given a central coating of one confection surrounded by an annular ring of the other. Since the movements of the parts under given adjustments of timing and quantity adjustments are repeated at each cycle of operation of the machine it is obvious that by timing an element to which are connected actuating connections for both the jelly valve and plunger, the plunger connections including means for varying the quantity of icing deposited by the plunger, with respect to an element to which are connected actuating connections for actuating the icing valve and plunger, the plunger connections also including means for varying the amount of icing deposited by the icing plunger, the variations in adjustment necessary for such a variety of work will be supplied. To accomplish this change of timing, affecting both the valve and plunger of one depositing mechanism with respect to the valve and plunger of the other depositing mechanism, by a single adjustment which can be readily made while the machine is in operation constitutes one feature of my present invention.

This relative timing of the action of the two depositing mechanisms is accomplished in the present instance by operating the icing plunger and valve through a cross shaft 32 upon which is mounted a sleeve 33 angularly adjustable on said shaft and connected to the jelly plunger and valve. This shaft 32, it may be explained is driven from the main driving shaft 34 of the machine (see Fig. 1) through a change-speed belt 35 engaging a pulley on said shaft and a pulley on a cross-shaft 36, and reducing gearing including a sprocket wheel on said shaft 36 engaged by a sprocket chain 37, sprocket wheels on a cross-shaft 38 severally engaged by said chain 37 and a sprocket chain 39, and a sprocket wheel on said shaft 32 engaged by said chain 39.

The double train of connections for operating the icing plunger 27 includes a pair of eccentric disks 40 secured to said shaft 32 near its oposite ends; connecting rods 41 fixed to eccentric straps engaging said disks and pivoted to adjusting frames 42 which are provided with slidingly adjustable pivot blocks 42ª and are journaled upon a fixed cross-shaft 43; connecting rods 44 pivoted to said pivot blocks connecting said cross-frames and a cross-head 45; and posts 46 secured to said cross-head and to the plunger 27.

The cross-head 45 near its opposite ends extends through guide-ways in a guide-frame 47 secured to the hopper frame, this guide-frame in the present instance consisting of vertical bars 49 spaced apart by blocks 50 and cross spacing bars 51.

By adjustment of the pivot blocks above referred to in the frames 42, the throw of the connecting rods may be varied and the quantity of confection deposited at each stroke thereby controlled. A simultaneous adjustment of both pivot blocks is provided by a hand wheel 100 secured to a shaft 101 which is journaled in offset extensions at the rear ends of the two frames and to which are secured opposite beveled pinions 102—102 severally meshing with pinions 103—103 secured to screw rods 104—104 rotatably mounted in two frames and arranged to engage threaded bores in the respective pivot blocks.

Figure 2:
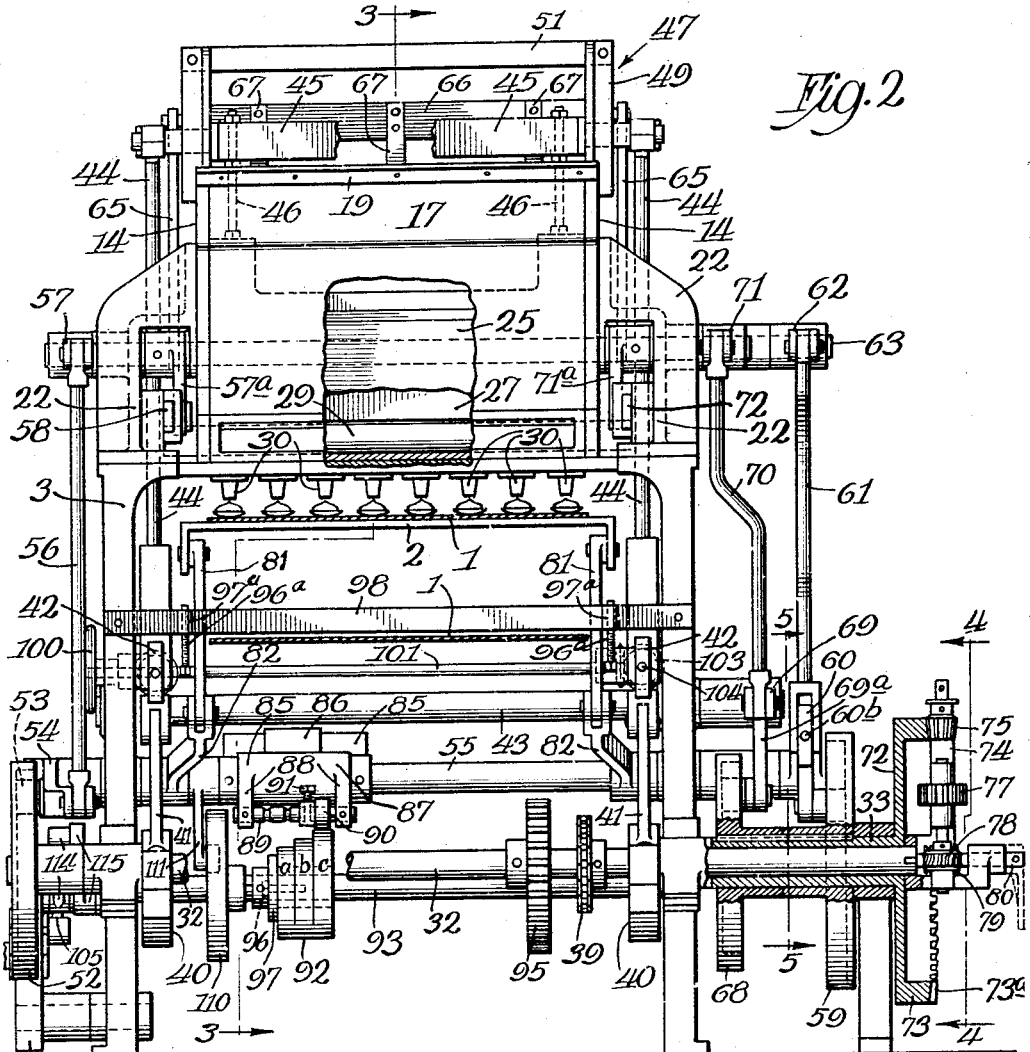
Fig. 2 is an elevation of the parts of the machine viewed from a plane just in front of the forward or larger supply hopper and looking towards the rear or feeding end of the machine, certain portions being broken away and sectioned to better illustrate their construction.

The train of connections for operating the valve 29 of the icing-depositing mechanism includes a cam disk 52 secured to the end of the shaft 32 at the right side of the machine,—at the left in Fig. 2—formed with a side cam groove engaged by a cam roller 53 intermediately pivoted on a rocking arm 54 which is rotatably mounted on a rock shaft 55 journaled in the machine frame at its opposite sides. To the front end of this arm (Figs. 1 and 2) is pivoted the lower end of a link 56 which is pivoted to the horizontal member of a bell-crank 57. This bell-crank has a vertical member 57ª formed with a bearing orifice loosely engaged by a headed stud secured to a horizontal rack-bar 58 slidingly mounted in the hopper frame. This rack bar is arranged to cooperate with the projecting toothed end of the icing valve 29, which extends through the right end wall of the hopper frame, and is formed as shown in Fig. 6.

As before stated the jelly plunger and valve are operated through a sleeve 33 which is arranged to be adjustably secured to the shaft 32 in any desired angular relation thereto. The jelly plunger is operated by a cam disk 59 secured to said sleeve, which disk is formed with a cam groove in its side face engaged by a roller carried by a leg forming part of a rocking frame 60 which is pivoted on the cross-rod 55 above mentioned, see Figs. 2 and 6. This rocking frame is equipped with a slidingly mounted pivot block 60ª which is adjustable in the frame through a screw rod 60ᵇ making threaded engagement with it which is journaled in the frame and equipped with a hand wheel for turning it. To this pivot block is pivoted the lower end of a link 61 whose upper end is pivotally connected with a horizontal lever 62 secured to a rock shaft 63 to which is secured a pair of rock arms 64—64 (one of which is shown in Fig. 1, see also Fig. 3), connected by links 65—65 to a cross-head 66, see Figs. 1 and 2. The opposite ends of this cross-head extends through guide-ways in the guide-frame 47 before mentioned and it is connected by vertical bars 67 with the jelly plunger or piston 26.

Through adjustment of the pivot block 60ª in the frame 60, the throw of the connecting rod 61, and consequently of the jelly plunger, may be varied to govern the quantity of jelly deposited at each stroke.

The valve 28 of the jelly depositing mechanism is operated through connections including a cam disk 68 keyed to the sleeve 33; a rocking lever 69 pivoted on the fixed shaft 43 before mentioned and having a downward extension 69ª equipped with a cam collar engaging said groove; a link 70 pivotally connected to said arm and also pivotally connected to a bell crank 71 which has a vertical member 71ª formed with a bearing orifice arranged to engage a headed stud secured to a horizontal rock bar 72 slidingly mounted in the hopper frame and arranged to cooperate with the toothed end of the jelly valve 28, which extends through the left end wall of the hopper frame into position to mesh with the rack bar.

Figure 4:
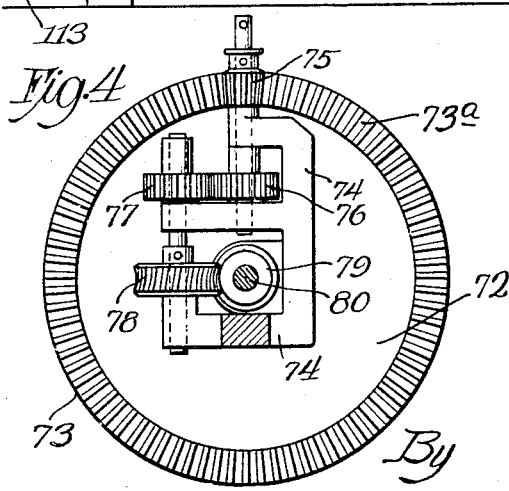
Fig. 4 is a vertical fragmentary section in a plane indicated by the line 4—4 of Fig. 2, looking in the direction of the arrow, certain parts beyond the plane being shown in elevation.
Figure 5:
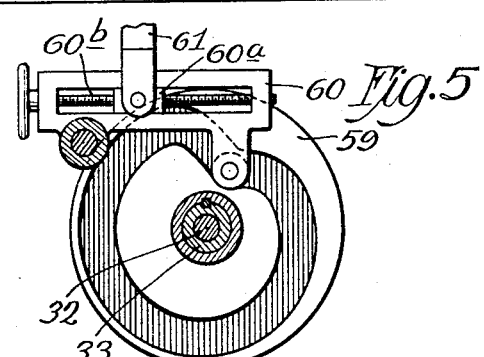
Fig. 5 is a vertical fragmentary section of like character on the line 5—5 of Fig. 2.

Coming now to the means for adjusting the sleeve 33 upon the shaft 32, to vary the timing of the two depositing mechanisms—(see Figs. 2 and 4,)—the outer end of the sleeve (which is free to rotate on the shaft) is formed with a plate 72 having a flange 73 formed with a bevel gear 73ª at its outer edge. Within the flange 72 and fixed to the shaft 32 is arranged a driving frame 74 in which is journaled a beveled pinion 75 meshing with the gear 73ª. The shaft of this pinion 75 carries a spur pinion 76 arranged to mesh with a spur pinion 77 fixed to a shaft also journaled in the frame 74, and to this shaft is secured a worm wheel 78 meshing with a worm 79 on a short shaft 80 which is also journaled in the frame 74 and is arranged in alignment with the shaft 32, but is not connected to it. The outer end of this shaft 80 is squared or otherwise formed for engagement with a removable handle.

It is obvious that rotation of the shaft 32 and the driving frame 74 secured to it will constrain the disk 73 and sleeve 33 to rotate with it through engagement of the teeth of the bevel pinion 75 with the gear 73ª of the disk 73, the worm 79 acting as a lock to prevent rotation of the gearing carried by the frame and the entire frame and train of gearing mounted in it rotating as a whole. Rotation of the worm 79, however, which may be effected by the handle while the machine is in operation, will cause rotation of the connected gears and through reaction between the pinion 75 and gear 73ª effect a change in the angular relation of the sleeve 33 and shaft 32. Since the adjustment may be made and the effect of it observed while the machine is running, the regulation to produce the desired result may be quickly made with the greatest nicety.

The pinion 75, it is to be noted, may be lifted on its shaft out of engagement with the gear 73ª and secured in disengaging position, with the effect of entirely disconnecting the jelly depositing mechanism from the shaft 32, so that the machine may be operated with only the icing depositing mechanism in operation.

In order to vary the form of the deposits upon wafers to produce an attractive variety of goods it is desirable that the rocking table and belt shall be lifted to the depositing nozzles through various distances, and the means for accomplishing this result will now be described.

The rocking table 2 which supports the intermittently shifted feed belt over the surface of which the wafers are fed forward and positioned under the depositing nozzles by means of the rectifying frame as hereinbefore explained, is supported by two vertical links 81—81 (see Figs. 2 and 3), pivoted at upper ends to the table and at their lower ends severally to a pair of arms 82 which are rigidly secured to the rock shaft 55 before mentioned. This rock shaft is provided with a threaded block 83 rigidly secured thereto, engaged by a screw shaft 84 equipped with a hand wheel 84ª by which it may be turned. Adjacent the block 83 and rotatably mounted on the rock shaft 55, is arranged the hub 87 of a rocking yoke 85 which is formed with a lug 86 projecting into the path of the screw shaft 84. The yoke 85 is formed with a pair of yoke arms 88 between which extends a short shaft 89, formed with annular grooves,—see Figs. 2 and 3. Slidingly mounted on this shaft 89 is a cam roller 90 having a hub equipped with a set screw 91 having a rounded nose through which the cam may be set to rotatably engage the shaft in any one of three positions determined by the annular grooves upon the shaft. This roller is arranged to bear upon one or the other of the three cam faces, marked $a$, $b$ and $c$, of a triple-faced cam 92 which is rigidly secured to a cross shaft 93 journaled in the side members of the machine frame. This shaft is equipped with a gear wheel 94 meshing with a gear wheel 95 secured to the driven shaft 32 before mentioned, the connections for driving which have before been explained.

For the purpose of setting the cams to proper angular position to cooperate with other parts of the machine the cam body is adjustably mounted on the shaft 32, and is secured thereto by means of a bolt 96 engaging a threaded socket in the side face of the cam body and engaging one or the other of a series of orifices formed in a plate 97 having a hub which is keyed to said shaft.

It is obvious that the weight of the table, sustained through the connection just described will cause the cam roller 90 to closely follow the particular cam face of the cam 92 with which it is engaged, and that by adjustment of the yoke 85 its angular relation to the shaft 55 and consequently the vertical position of the free end of the table may be varied.

It has been found in practice that the best results are attained by lifting the table to one and the same upper level adjacent the depositing nozzles whatever the form of deposit it is desired to produce on the wafers. If a relatively low rounded deposit (see Fig. 7) is desired, the table is lifted through a relatively short distance between a lower level of the table to this fixed upper level, and the cam face $a$ is consequently employed, by making a proper setting of the cam roller 90 upon its shaft so that it will cooperate with such face, and making a proper adjustment of the hand wheel 84ª so that the table will stand at the upper level while the deposit is being made, and then fall a distance determined by the pitch of the cam to a lower level. It will be noticed that from the angular position at which cam face $a$ in its rotation reaches its highest point, the face is formed with a dwell extending approximately a half revolution through which a stationary position of the table is maintained while the deposit is being made. When the machine is adjusted so that face $b$ is being used the drop from the uper level begins earlier, with a gradual drop to a lower position than in the case of cam face $a$, and with cam face $c$ the fall of the table is still greater and somewhat more rapid, the effect of the different cam faces, providing for the different forms of deposits, illustrated respectively in Figs. 7, 8 and 9. The setting of the hand wheel 84ª may conveniently be made with reference to the highest point of whichever one of the cam faces is selected. If the cam face $a$ is being used the table and belt will fall from the uppermost position in which the wafer is close to the nozzle 30 to the lower position shown, making a relatively low rounded deposit shown in Fig. 7, while if the cam face $b$ is used the table and belt will fall from the same uppermost position to a lower level, making a higher deposit, as shown in Fig. 8, and if face $c$ is employed the table and belt will fall to the still lower level shown in Fig. 9, producing the higher and more pointed deposit illustrated in that figure.

In case it is desired to make a very low deposit on the wafers, the table may be secured in a fixed high position, and no lift at all imparted to it. For this purpose I have provided a pair of supporting screws 96ª threaded in blocks 97ª which are carried by a cross-bar 98 secured at its opposite ends to the machine frame. The screws 96ª in uppermost position are arranged to support the side members of the table frame, and in lower position are disengaged therefrom to permit the table to be given the rocking movement hereinbefore described.

I claim:—

1. In a depositing machine having a feed belt and a pivoted table supporting said belt and forcing mechanism including a cross-row of nozzles arranged to intermittently deposit charges of confection, means for synchronously lifting said table and belt intermittently into proximity with said nozzles, and means for varying the length of such lifting movement.

2. In a depositing machine having a feed belt and a pivoted table supporting said belt and forcing mechanism including a cross-row of nozzles arranged to intermittently deposit charges of confection, means for synchronously lifting said table and belt different distances into proximity with said nozzles, said lifting means including a driven multiple-faced cam having different degrees of throw, and a cooperating cam member connected with said table and arranged to be shifted into position to cooperate with any selected face of the first mentioned cam member.

3. In a depositing machine having a feed belt and a pivoted table supporting said belt and forcing mechanism including a cross-row of nozzles arranged to intermittently deposit charges of confection, means for synchronously lifting said table and belt different distances into proximity with said nozzles, said lifting means including a rotating cam provided with a plurality of cam faces having different degrees of throw, and a cooperating cam roller connected with said table and arranged to be axially shifted into position to cooperate with any selected face of said rotating cam.

4. In a depositing machine having a feed belt and a pivoted table supporting said belt and forcing mechanism including a cross-row of nozzles arranged to intermittently deposit charges of confection, means for synchronously lifting said table and belt different distances into proximity with said nozzles, said lifting means including a rotating cam body formed with a plurality of peripheral cam faces having different degrees of throw, and a rocking yoke connected with said table and having a shaft equipped with a cam roller arranged to be axially shifted into position to cooperate with any selected face of said cam body.

5. In a depositing machine having a feed belt and a pivoted table supporting said belt and forcing mechanism including a cross-row of nozzles arranged to intermittently deposit charges of confection, means for synchronously lifting said table and belt different distances into proximity with said nozzles, said lifting means including a rotating cam body formed with a plurality of peripheral cam faces having different degrees of throw, and a rocking yoke connected with said table and having a shaft formed with a corresponding number of annular grooves and equipped with a cam roller which is arranged to be axially shifted into position to cooperate with any selected face of said cam body and which is formed with a hub equipped with a set screw arranged to loosely engage a groove in said shaft and position the cam in cooperative relation to a corresponding face on the cam roller.

6. In a depositing machine having a feed belt and a pivoted table supporting said belt and forcing mechanism including a cross-row of nozzles arranged to intermittently deposit charges of confection, means for synchronously lifting said table and belt different distances into proximity with said nozzles, and independent means for stationarily supporting said table in upper position at will.

7. In a machine of the character described, a depositing mechanism including a supply hopper, a forcing chamber, a plunger in said chamber, discharge nozzles and a rotary valve arranged in one position to control communication between said supply hopper and forcing chamber and in another position to control communication from said forcing chamber and said nozzles; a driven shaft; plunger-operating connections between said shaft and said plunger; valve-operating connections between said shaft and said valve; a second depositing mechanism also including a supply hopper and a forcing chamber and a plunger in said chamber and discharge nozzles and a rotary valve arranged to similarly control communication between said supply hopper and forcing chamber and between said forcing chamber and nozzles; a driving element connected with said driven shaft and angularly adjustable with respect thereto; plunger-operating connections between said driving element and said second-mentioned plunger; and valve-operating connections between said driving element and said second-mentioned valve.

8. In a machine of the character described, a depositing mechanism including a plunger and a valve, a second depositing mechanism also including a plunger and a valve, a driven shaft, operating connections connected with said shaft and arranged to actuate said first-mentioned plunger and valve, a sleeve loosely mounted on said shaft connected to said second plunger and valve, a gear wheel fixed to said sleeve, a driving frame fixed to said shaft, and a train of connected gearing mounted in said driving frame including a pinion meshing with said gear wheel and a worm on a manually operable shaft in axial alignment with said first-mentioned shaft.

9. In a machine of the character described, a depositing mechanism including a plunger and a valve, a second depositing mechanism also including a plunger and a valve, a driven shaft, operating connections connected with said shaft and arranged to actuate said first-mentioned plunger and valve, a sleeve loosely mounted on said shaft connected to said second plunger and valve, a gear wheel fixed to said sleeve, a driving frame fixed to said shaft, and a train of connected gearing mounted in said driving frame including a pinion meshing with said gear wheel and a worm on a manually operable shaft in axial alignment with said first-mentioned shaft, said pinion being arranged to be shifted to position of disengagement with said gear wheel.

10. In a machine of the character described, a depositing mechanism including a plunger and a valve, a second depositing mechanism also including a plunger and a valve, a driven shaft, operating connections connected with said shaft and arranged to actuate said first-mentioned plunger and valve, a sleeve loosely mounted on said shaft connected to said second plunger and valve, a flanged disk fixed to said sleeve and formed with a laterally extending beveled gear on its outer face, a driving frame fixed to said driven shaft, and a train of connected gearing mounted in said driving frame including a bevel pinion meshing with said beveled gear, said pinion being non-rotatably secured to a shaft carrying a spur pinion, a second spur pinion meshing with said first-mentioned spur pinion and fixed to a shaft to which is secured a worm wheel, a worm meshing with said worm wheel on a shaft arranged in axial alignment with said driven shaft, said worm shaft being arranged to be manually rotated.

11. In a machine having a driven shaft and a connected train of mechanism operated by said shaft, a sleeve loosely mounted on said shaft and connected to a second train of mechanism operated by said sleeve, and means for adjustably connecting said sleeve to said shaft including a gear wheel fixed to said sleeve, a driving frame fixed to said shaft, and a train of connected gearing mounted in said driving frame including a pinion meshing with said gear wheel and a worm on a manually operable shaft in axial alignment with said first-mentioned shaft.

12. In a machine having a driven shaft and a connected train of mechanism operated by said shaft, a sleeve loosely mounted on said shaft and connected to a second train of mechanism operated by said sleeve, and means for adjustably connecting said sleeve to said shaft including a gear wheel fixed to said sleeve, a driving frame fixed to said shaft, and a train of connected gearing mounted in said driving frame including a pinion meshing with said gear wheel and a worm on a manually operable shaft in axial alignment with said first-mentioned shaft, said pinion being arranged to be shifted to position of disengagement with said gear wheel.

13. In a machine having a driven shaft and a connected train of mechanism operated by said shaft, a sleeve loosely mounted on said shaft and connected to a second train of mechanism operated by said sleeve and means for adjustably connecting said sleeve to said shaft including a flanged disk fixed to said sleeve and formed with a laterally extending beveled gear on its outer face, a driving frame fixed to said driven shaft, and a train of connected gearing mounted in said driving frame including a bevel pinion meshing with said beveled gear, said pinion being non-rotatably secured to a shaft carrying a spur pinion, a second spur pinion meshing with said first-mentioned spur pinion and fixed to a shaft to which is secured a worm wheel, a worm meshing with said worm wheel on a shaft arranged in axial alignment with said driven shaft, said worm shaft being arranged to be manually rotated.

In testimony whereof, I have subscribed my name.

FERDINANDO G. SALERNO.